US009584358B2

(12) United States Patent
Arnold et al.

(10) Patent No.: US 9,584,358 B2
(45) Date of Patent: Feb. 28, 2017

(54) GLOBAL PRODUCTION RULES FOR DISTRIBUTED DATA

(71) Applicant: International Business Machines Corporation, Armonk, NY (US)

(72) Inventors: Matthew R. Arnold, Ridgefield Park, NJ (US); Martin J. Hirzel, Ossining, NY (US); Vijay A. Saraswat, Mahopac, NY (US); Avraham E. Shinnar, Hawthorne, NY (US); Jerome Simeon, New York, NY (US); Lionel A. Villard, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 14/199,285

(22) Filed: Mar. 6, 2014

(65) Prior Publication Data
US 2015/0254558 A1 Sep. 10, 2015

(51) Int. Cl.
G06F 17/30 (2006.01)
G06Q 30/02 (2012.01)
G06N 5/02 (2006.01)
G05B 15/02 (2006.01)
H04L 29/08 (2006.01)
G06F 9/46 (2006.01)

(52) U.S. Cl.
CPC .......... H04L 29/08135 (2013.01); G06F 9/46 (2013.01); G06F 17/30424 (2013.01); G06N 5/02 (2013.01); G06Q 30/0201 (2013.01); G05B 15/02 (2013.01)

(58) Field of Classification Search
None
See application file for complete search history.

(56) References Cited

U.S. PATENT DOCUMENTS 7,945,639 B2   5/2011   Gavrilov et al.
2005/0086257 A1   4/2005   Wright
2006/0287953 A1   12/2006   Chauhan

OTHER PUBLICATIONS

Dean et al., "MapReduce: Simplified data processing on large clusters", in Operating Systems Design and Implementation (OSDI) Dec. 2004, pp. 137-150.*

(Continued)

*Primary Examiner* — Qing Wu
(74) *Attorney, Agent, or Firm* — Scully, Scott, Murphy & Presser, P.C.; Kevin J. Jordan

(57) ABSTRACT

Running a global production rule on data distributed over a plurality of machines may comprise receiving a local production rule that can run on each of the plurality of machines to jointly accomplish a global computation specified by the global production rule. The local production rule may be deployed to each of the plurality of machines, each of which stores a portion of the data and runs an instance of a rules engine that can run the local production rule. The plurality of machines are enabled to communicate intermediate data produced by the instance of the rules engine running the local production rule on said each of the machines. Coordinating between the plurality of machines is enabled to synchronize one or more local computations performed locally according to the local production rule on said each machine.

17 Claims, 9 Drawing Sheets

(56) References Cited

OTHER PUBLICATIONS

Dewitt et al., The Gamma Database Machine Project, In Transactions on Knowledge and Data Engineering (ToKaDE), Mar. 1990, pp. 44-62, vol. 2, No. 1.
Alvaro et al., Boom analytics: exploring data-centric, declarative programming for the cloud. EuroSys, Apr. 2010, pp. 223-236.
Forgy, OPS5 user's manual. Technical report, No. 2397, Carnegie Mellon University (CMU), Jul. 1981, pp. 1-57.
Bali, Drools JBoss Rules 5.0, Developer's Guide, Packt Publishing. Jul. 2009, pp. 1-36.
JRules: Flexible, governed decision making, Sep. 2013, p. 1, http://www.ibm.com/software/integration/business-rule-management/jrules-family/.

\* cited by examiner

GLOBAL PRODUCTION RULES FOR DISTRIBUTED DATA

FIELD

The present application relates generally to computers and computer applications, and more particularly to global computations over distributed data stores, and using production rules for such computations.

BACKGROUND

A production rule system application may allow users to develop and run rules or rulesets, e.g., to achieve a business goal. The known production rule systems operate over local data stores without distribution. For instance, no global mechanism is provided for globally operating on distributed data. While systems such as distributed databases or MapReduce can specify global computations over a distributed data store, they do not use a production rule language.

BRIEF SUMMARY

A method of running a global production rule on data distributed over a plurality of machines, in one aspect, may comprise receiving a local production rule that can run on each of the plurality of machines to jointly accomplish a global computation specified in the global production rule. The method may further comprise deploying the local production rule to each of the plurality of machines. Each of the plurality of machines may store a portion of the data and running an instance of a rules engine that can run the local production rule. The method may also comprise allowing communicating between the plurality of machines, intermediate data produced by the instance of the rules engine running the local production rule on each of the machines. The method may further comprise allowing coordinating between the plurality of machines to synchronize one or more local computations performed locally according to the local production rule on each machine.

A system for running a global production rule on data distributed over a plurality of machines, in one aspect, may comprise a processor and a module operable to execute on the process and further operable to receive a local production rule that can run on each of the plurality of machines to jointly accomplish a global computation specified in the global production rule. The global production rule may comprise a global computation to be performed on the data globally. The module may be further operable to deploy the local production rule to each of the plurality of machines. Each of the plurality of machines may store a portion of the data and run an instance of a rules engine that can run the local production rule. Communicating between the plurality of machines, intermediate data produced by the instance of the rules engine running the local production rule on each of the machines, may be allowed via execution of the local production rule. Coordinating between the plurality of machines to synchronize one or more local computations performed locally according to the local production rule on each machine, may be allowed via execution of the local production rule.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A methodology of the present disclosure in one embodiment allows users to describe scalable computations on large data sets. For example, a data store (e.g., a data repository of a set of computer data such as objects and files) may be distributed for scalability reasons. Global computations over the distributed store are needed to enable decisions that are based on data from more than one local machine. The methodology of the present disclosure in one embodiment allows users to formulate these computations in a production rule language. In one aspect, the users may be already familiar with a style of such production rule language, and hence the users may find it very usable.

In one aspect, the present disclosure describes how a user may use production rules to perform a distributed computation over a large data set. In one embodiment of the present disclosure, a cluster of machines may be used, each machine in the cluster having its own local store and its own local production rules engine instance. The large data set is distributed over these local stores, with each store holding a portion of the data. The user specifies production rules that operate on the distributed data set viewed as a "global working memory". To accomplish this, the methodology of the present disclosure in one embodiment may provide for global communication and coordination between the machines. This global communication and coordination may be used to faithfully implement the illusion of rules running on global working memory.

Production rules are computer programs that can be executed to achieve a goal or result. A production rule has two parts: left-hand side (LHS) which represents a condition and right hand side (RHS) which represents an action. A production rule's LHS (the condition portion) is tested or pattern matched against the current state of the working memory. The working memory refers to memory structure comprising data or database of data, over which computation is being performed by the production rule. The RHS (action) is triggered if the LHS matches pattern in the working memory (i.e., condition of the LHS is satisfied by the working memory). The action of the RHS may update the working memory and/or create new working memory. The production rule may run until no current working memory satisfies the condition of the production rule. The production rule may stop also as a result of a user interrupt. A methodology of the present disclosure in one embodiment enables global execution of such production rules over data or working memory that is distributed over a plurality of machines.

Figure 1:
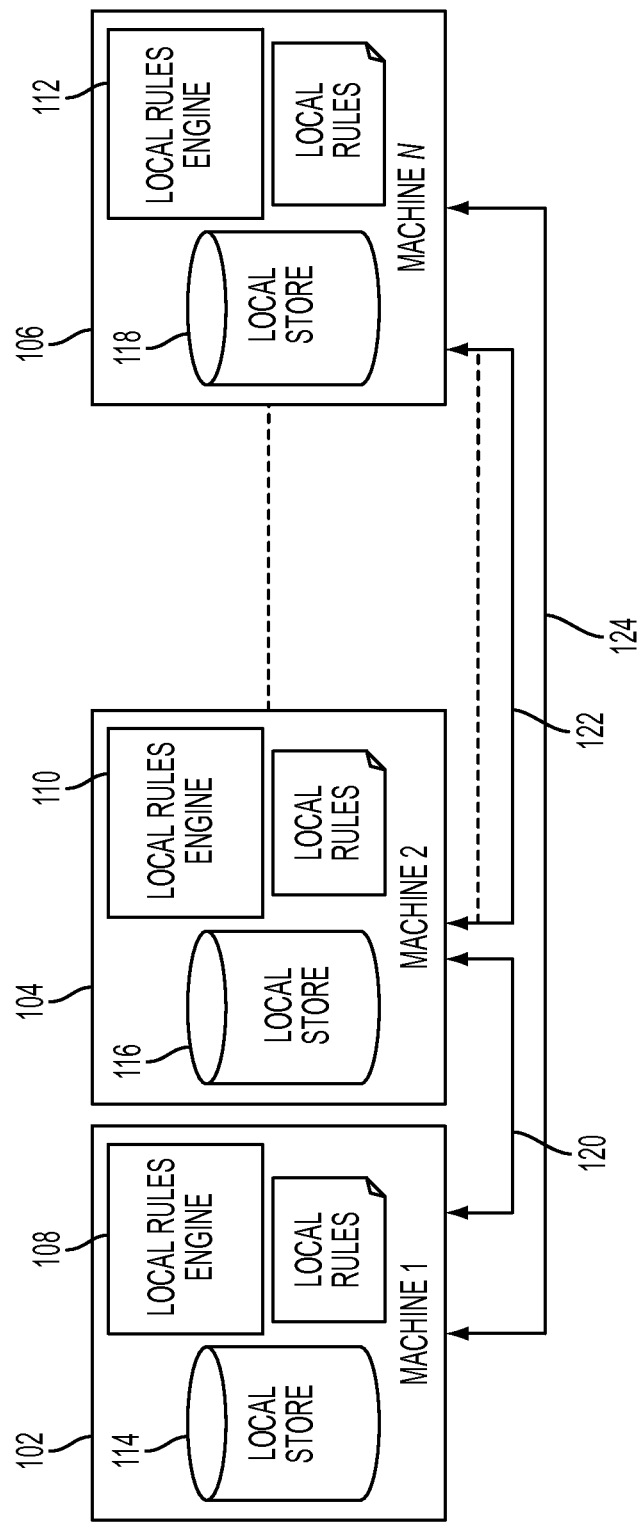
FIG. 1 is a diagram illustrating global production rules for distributed data in one embodiment of the present disclosure.

FIG. 1 is diagram illustrating an overview of global production rules for distributed data in one embodiment of the present disclosure. A cluster of machines may include a plurality of machines, e.g., machine 1 (102), machine 2 (104), . . . machine N (106). Each of the machines may include a local rules engine (e.g., 108, 110, 112, respectively), a partitioned global store (also referred to as a machine's local data store, e.g., 114, 116, 118), and global coordination and communication (120, 122, 124).

In one embodiment of the present disclosure, the global production rules are used to run a computation over a large data set stored collectively on the machines. In one embodiment of the present disclosure, each machine has a local data store (e.g., 114, 116, 118) that stores a portion of the data set. In one aspect, it is assumed that the data has been already distributed among the machines.

In one embodiment, production rules may be used for expressing the computation. As an example, production rules can be implemented using a distributed store such as WebSphere eXtreme Scale (WXS) from International Business Machines Corporation (IBM) of Armonk, N.Y. For example, each machine (e.g., 102, 104, 106) of the cluster hosts and runs a local instance of a production rules engine (e.g., 108, 110, 112), such as IBM's JRules engine. To work together in the global computation, the machines of the cluster communicate and coordinate the global computation with each other, e.g., as indicated by inter-machine edges at 120, 122 and 124. The communication is used to send intermediate computation results between machines. The coordination is used to trigger the right rules at the right time whenever that depends on the state of other machines, and to detect termination when the global computation has finished on all machines.

The rules that run on each of the local machines can be written manually or automatically generated by a translator (e.g., a computer executable module). Such a translator is described in more detail below. The global communication and coordination between the machines of the cluster can follow one of several possible regimes. An example mechanism for the global communication and coordination may include a bulk-synchronous regime, wherein the global computation is staged, and wherein those stages are synchronized across all machines in the cluster. Another example mechanism may include a pipelined or asynchronous mechanism.

Figure 2:
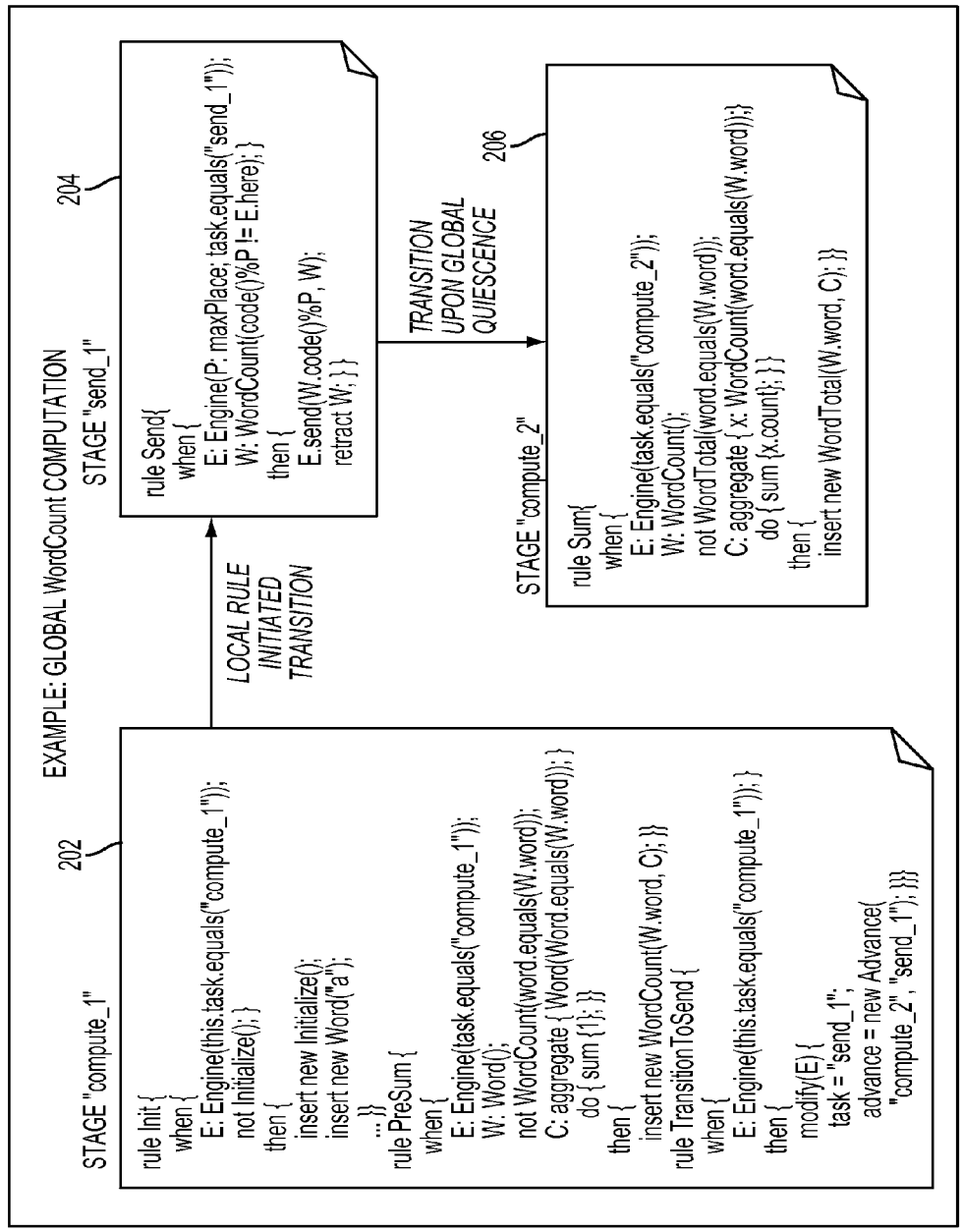
FIG. 2 illustrates an example of a global rules computation in one embodiment of the present disclosure.

FIG. 2 illustrates an example of a global rules computation in one embodiment of the present disclosure. The global rules computation shown is written using local rules grouped in "stages", and assuming a runtime system for global coordination and communication of the present disclosure in one embodiment. The runtime system may manage the running of the local rules. The example computation shown is called WordCount. As an example, the input is a large textual data set, which is partitioned across the local stores on the cluster of machines. That means that each local store may contain a large bag of words. The same word might be stored in the same or a different local store multiple times if it occurs multiple times in that part of the textual data set. The objective of the WordCount computation is to count, for each word, how often it occurs in the global data set.

The computation in FIG. 2 has three stages with two transitions. It starts with Stage compute_1 (202). When the global computation starts, every machine uses its local rules engine instance to run the rules in Stage compute_1 (202). Stage compute_1 (202) computes local counts of just the words in the given local store only. It has three rules: rule Init initializes the computation; rule PreSum computes the local word counts; and rule TransitionToSend, which has the least specific left-hand side (conditional part of a rule) and fires only when the other rules are done, triggers the transition to Stage send_1 (204). In the example, the left-hand-side (LHS) comprises the clause after "when" but before "then". An LHS is more specific if it includes more conditions. Out of the three rules in stage "compute_1", rule Init has two conditions, rule PreSum has four conditions, and rule TransitionToSend has only one condition. Therefore, in the example, rule InitToSend is least specific. Thus, rule TransitiontoSend waits for the other two rules to finish, before the next stage is invoked.

Stage send_1 (204) sends the intermediate results containing local word counts to other machines for continued processing. More specifically, the expression 'code( ) % P' computes the hash-code of a word, resulting in an integer H, and then computes H modulo P, where P is the number of machines in the cluster. This yields an integer M identifying a machine. If the machine M differs from the current machine (denoted 'here'), the rule sends the word-count to machine M. Note that this same rule executes in each of the local rules engine instances across the cluster. The effect of this is that the local word-count results are repartitioned across the local stores such that after Stage send_1, all intermediate results for the same word reside on the same machine.

The transition from Stage send_1 (204) to Stage compute_2 (206) is initiated automatically by a methodology of the present disclosure in one embodiment. The methodology of the present disclosure in one embodiment detects global quiescence, meaning it notices when all machines have finished Stage send_1 and all the data sent by Stage send_1 has arrived in the appropriate machines. At that point, the methodology of the present disclosure starts Stage compute_2 (206), so every machine uses its local rules engine instance to run the rules in Stage compute_2 (206). Stage compute_2 (206) sums up the intermediate results for each word to obtain the final result of the global computation.

In one embodiment of the present disclosure, a master machine may be selected that acts as a master to coordinate between the machines. The master machine may be one of the worker machines (i.e., one of the machines with the portion of the data set distributed on it), or a separate machine. The master machine may detect the global quiescence, for example, finds out when the worker machines are done with the previous stage, e.g., via one or more messages from the worker machines. When all worker machines are done, the master machine instructs the worker machines to start the next stage, e.g., via one or more messages.

In another embodiment, a different approach may take a more peer-to-peer approach, where instead of a designated master machine, the worker machines coordinate among themselves autonomously.

As the WordCount example illustrates, the methodology of the present disclosure in one embodiment enables a global computation to be expressed using rules executing on local rules engine instances. The rules refer to data stored in their colocated local stores. The rules contain code for sending data between machines, and the methodology of the present disclosure in one embodiment provides the infrastructure to both perform this global communication as well as coordinate the machines to accomplish the global computation.

While FIG. 2 illustrates WordCount as an example of a rule, it should be understood that the methodology of the present disclosure supports other global computations, by executing different rules, possibly with a different number of stages. Thus, the methodology of the present disclosure is not limited to only that computation. Global computations that can use the methodology of the present disclosure may include but are not limited to: building an index or a materialized view for future lookups; finding the set of teams a person is a member of; finding all bike stations close to a landmark; finding clusters based on a similarity metric; computing a popularity metric such as PageRank. Other global computations may be supported.

Figure 3:
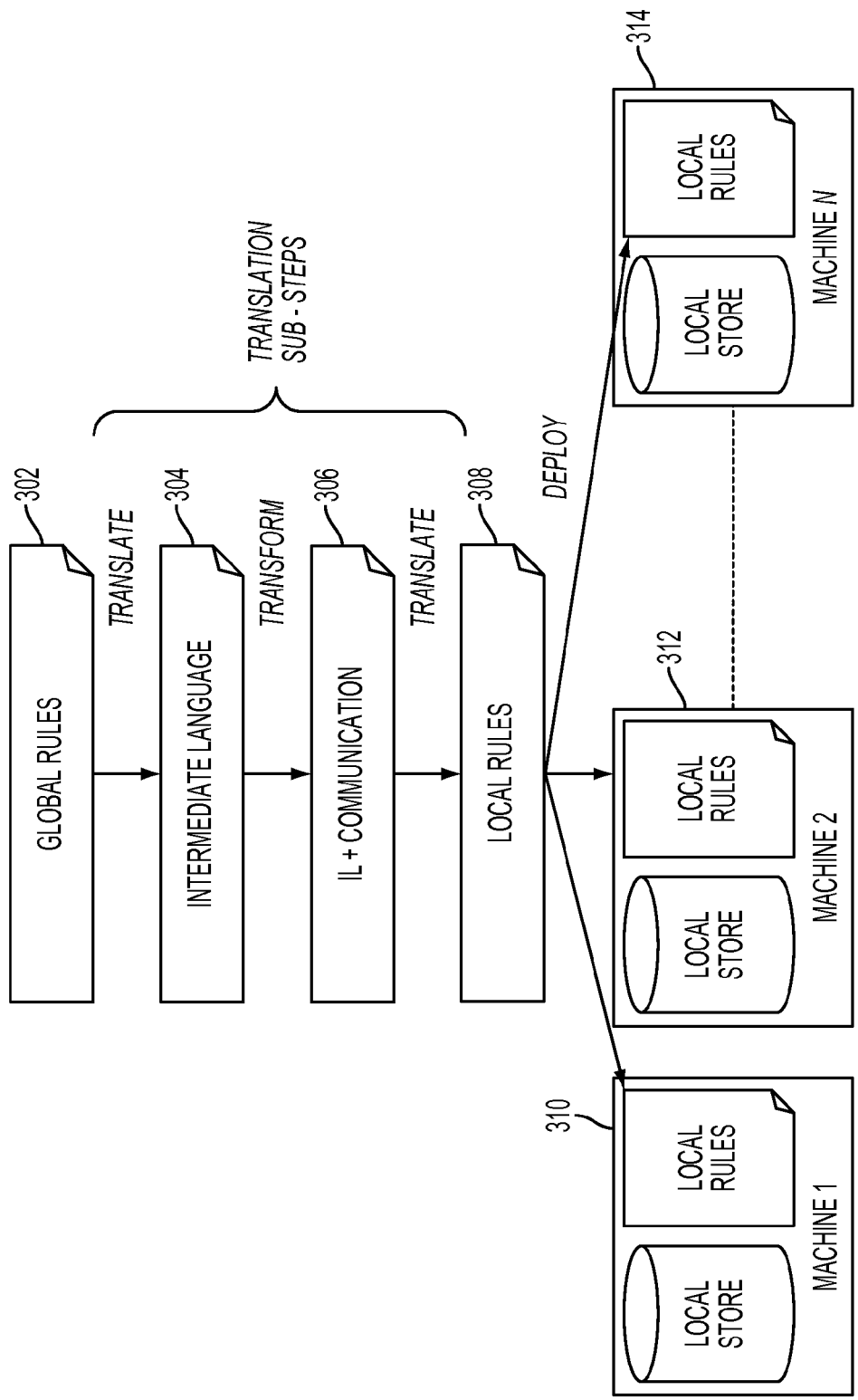
FIG. 3 is a diagram illustrating a method of translating from global rules to local rules in one embodiment of the present disclosure.

FIG. 3 is a diagram illustrating a method of translating from global rules to local rules in one embodiment of the present disclosure. The diagram shows in one embodiment how global rules can be translated into local rules through multiple translation steps, and those local rules can be deployed to run in the local rules engine instances. In this context, local rules refer to the rules executing directly on each of the local rules engine instances on the machines of the cluster. An example for local rules was shown with reference to FIG. 2. Local rules only observe the part of the data set stored locally, and may involve explicit code for communication and coordination with other machines. At the local rules level, the distribution of the data set is exposed, and the code takes that distribution into account. Global rules, on the other hand, describe the same global computation while hiding the distribution.

For a concrete example, consider the following code, which describes the WordCount computation using global rules.

```
rule WC {
when {
WordCount :
aggregate { word: Word( ); }
groupby { w: word.word; }
do { sum {1}; }
}
then { insert new WordCount(w, wordCount ); }
}
```

A translator according to one embodiment of the present disclosure may automatically translate the global-rules WordCount code shown above into the local-rules WordCount code illustrated in FIG. 2. For example, the input language (global rules) may have a set of features (including, but not limited to, variable binding, aggregate, field access, etc.). The translator knows each of these features, and can translate rules that use any combination of the features. This may be done in a multi-step process via an intermediate representation. The global-rules version may be more concise than the local-rules version, since the global-rules version can omit details that an automatic translator can generate. This may make global rules with translation a more attractive programming model for the business user and hence improve consumability.

Referring to FIG. 3, the starting point for the translation may be global rules 302. The translation may include multiple sub-steps, and eventually results in local rules 308. These local rules are then deployed on each of the local rules engine instances on each machine (e.g., 310, 312, 314). The translation may be performed, for example, on a machine that a developer might use. For example, the developer could run the translator on a developer's working machine (e.g., laptop or a personal computer), then deploy the computation on a cluster (e.g., 310, 312, 314).

In one embodiment of the present disclosure, a sub-step translates from global rules 302 to an intermediate language (IL) 304. An embodiment of the methodology of the present disclosure may use an intermediate language with nested relational algebra operators. Nested relational algebra, or NRA, contains the usual relational operators from databases (project, select, join, etc.) and adds some operators that are tailored for handling nested queries and nested data (map-Concat and others). Briefly, a nested relational algebra is a query language. Using an IL based on algebraic operators makes it possible to clearly identify where and how data gets grouped, for handling distributed data. In addition, an IL based on algebraic operators facilitates optimizations originating from the databases literature that can be applied in the present disclosure.

Another sub-step transforms the IL 304 to make communication explicit as shown at 306. The original IL 304, which was produced directly from global rules 302, does not explicitly indicate which computation can happen locally based on the subset of the intermediate results available in the local store, and which computation requires communication to redistribute data across different local stores. Specifically, this sub-step inserts a globalGroupBy operator. This operator corresponds to the global communication stages that send intermediate results to other machines based on their hash-codes. Conceptually, each occurrence of a globalGroupBy operator in the query plan cuts the graph, resulting in maximal subgraphs of entirely local algebraic operators.

Yet another sub-step transforms the IL with explicit communication 306 into local rules 308. Each maximal subgraph of local algebraic operators becomes a set of rules for a local computation stage. Each globalGroupBy operator at the boundary between two maximal subgraphs becomes a global communication stage. As discussed above for local rules, the local rules contain explicit communication, and the local rules engine implements that communication along with the necessary global coordination.

After all translation sub-steps have completed, the local rules 308 that form the end result of the translation are deployed on each of the machines, e.g., 310, 312, 314, of the cluster. Each machine runs an instance of a local rules engine configured to run the same local rules on the local store. After deployment, the cluster jointly performs the computation as described by the original global rules (which are distribution-oblivious) and as implemented by the local rules (which are distribution-aware).

Different regimes or mechanisms for global communication and coordination may be provided in the present disclosure, and one or more of the different regimes may be utilized in communicating and coordinating between the machines. An example regime includes bulk-synchronous computation, where all machines of the cluster may operate in lock-step. Other example regimes include pipelining and asynchronous/finish mechanisms.

Figure 4:
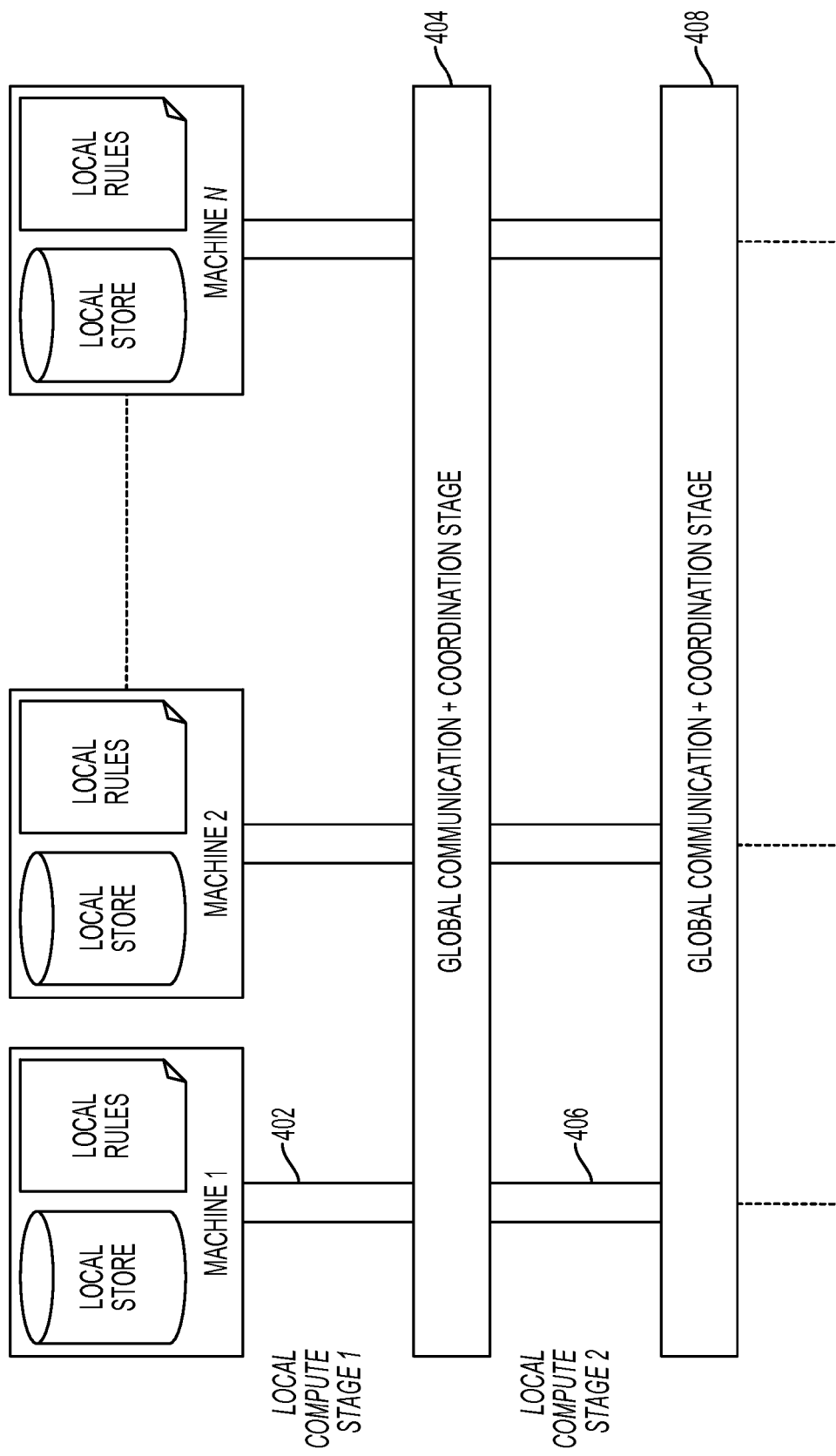
FIG. 4 shows an example of one global coordination and communication regime, called "bulk-synchronous", where stages of local computation take turns with stages of global communication and coordination barriers.

FIG. 4 shows an example of one global coordination and communication regime, called "bulk-synchronous", where stages of local computation take turns with stages of global communication and coordination barriers. In the bulk-synchronous regime, local compute stages alternate with global communication and coordination stages. To get these stages to line up on all machines, synchronization over all machines is needed, giving the regime its name. For example, the global WordCount computation from FIG. 2 can be executed using the bulk-synchronous regime. The runtime system detects global quiescence, which means that all machines have finished executing and all pending communication has reached its receiver. Detecting global quiescence may include implementing a bulk-synchronous barrier. Afterwards, the runtime system invokes of the next stage on all machines. For example, Local compute stage 1 (402) may include both "compute_1" and "send_1" stages shown in FIG. 2, after executions of which, all machines reach the global communication and coordination stage at 404. The next stage, local compute stage 2 (406), is then invoked on all machines. For example, referring to FIG. 2, "compute_2" stage may be invoked on all machines. After executing the local compute stage 2, all machines reach the global communication and coordination stage at 408.

As another example, e.g., different from a strict bulk-synchronous regime, pipelining relaxes the requirement that the previous stage must finish before the next stage commences. Often, one stage produces data (intermediate results) to be consumed by the next stage. For instance, if the amount of data is large, pipelining can overlap computation with communication: the producer can send its first data while still working on more, or the consumer already work on some data while still receiving more. Furthermore, pipelining can also overlap computation with other computation. The consumer can work on some data from the producer, while the producer is still working on more data. Such pipelining saves the space for storing the intermediate results in their entirety. Furthermore, such pipelining can make use of more compute resources (cores or machines) where available. In addition, pipelining can produce some preliminary results early before the entire computation finishes, giving the user a preview of what to expect.

Figure 5:
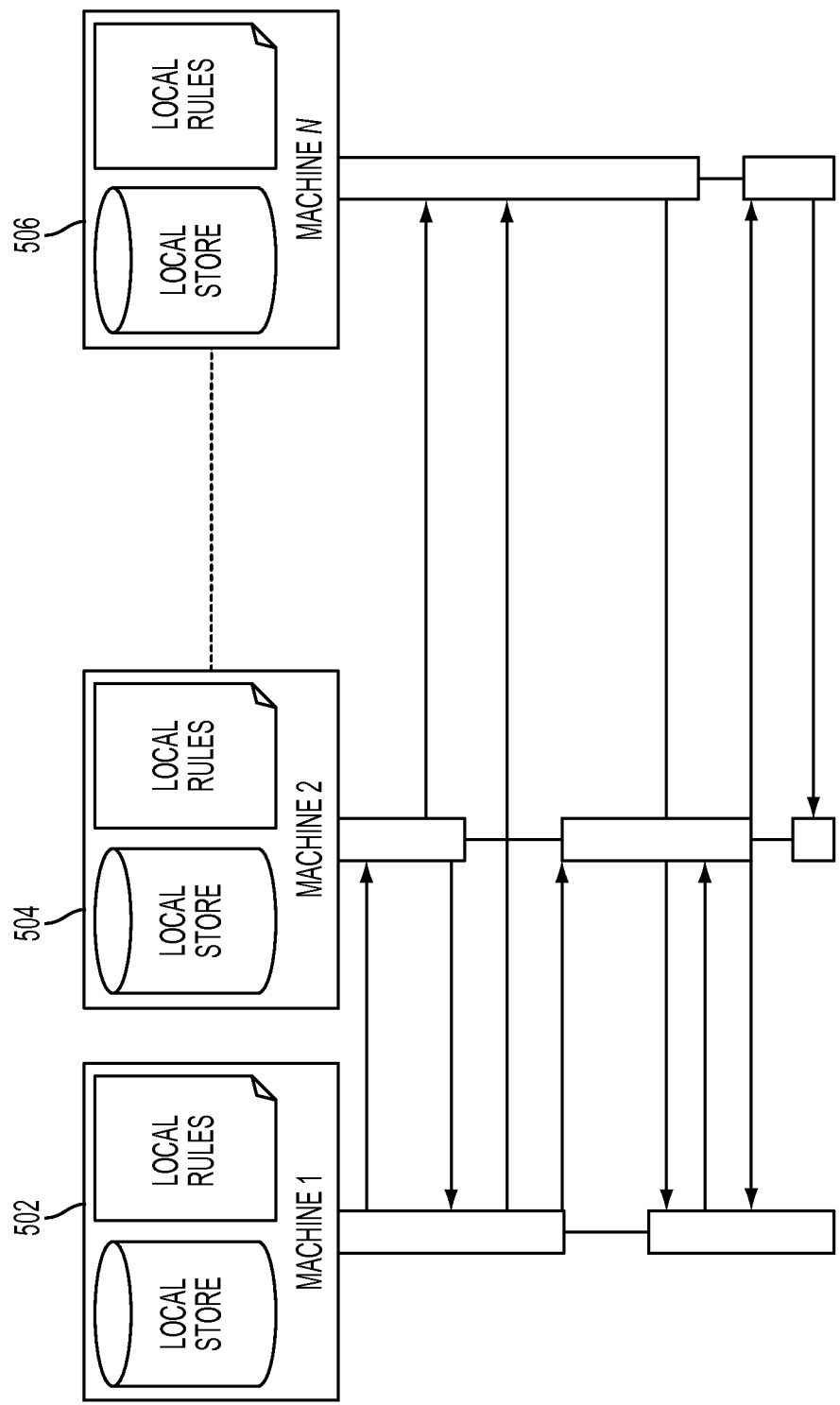
FIG. 5 shows another example of a different global coordination and communication regime, in which the computation is pipelined and/or asynchronous.

Yet another example, different from both the bulk-synchronous regime and the pipelined regime, is async/finish, which provides even more flexibility. FIG. 5 illustrates an async/finish regime for global communication and coordination in one embodiment of the present disclosure. With async/finish, different machines (e.g., 502, 504, 506) can compute or communicate simultaneously at different times. The vertical bars show different computation stages that the machines perform. The directional lines with arrows indicate communications from one machine to another. In one embodiment of the present disclosure, async and finish are two programming constructs that can be provided directly in the local-rules language. The async construct initiates some computation on a different machine, but does so asynchronously, which means that the originating machine that issues the async can continue with other computation without having to wait. The finish construct waits for a set of asyncs to complete. Together, the two allow for distributed fork/join style parallelism. This has been shown to be quite general, enabling a large range of computations. By adding async/finish to a rule language, the user may need to learn only a minimal set of new communication and coordination constructs while being able to use familiar rules concepts for most of their code.

Figure 6:
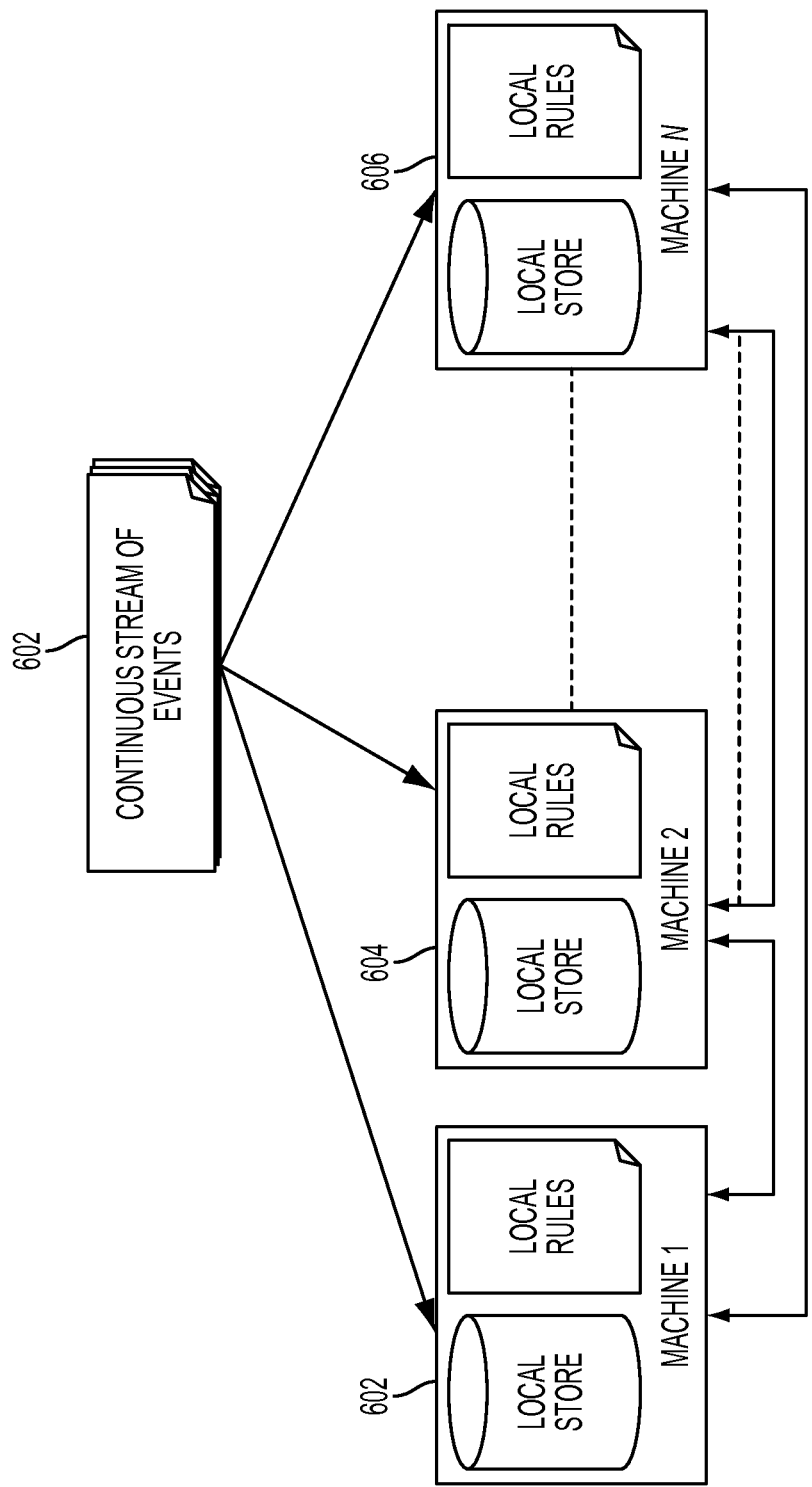
FIG. 6 illustrates an example of global rule computation for receiving external events in one embodiment of the present disclosure.

The above description explained a self-contained computation in local machines and communication and coordination among the machines. In one embodiment of the present disclosure, a mechanism may be provided, wherein the global rule computation can receive input from outside the cluster of machines in the form of a continuous stream of external events. FIG. 6 illustrates an example of global rule computation for receiving external events in one embodiment of the present disclosure. Just as the distributed data set (data at rest) is partitioned across the machines, the continuous stream of events (data in motion) also needs to be partitioned across the machines, as shown in FIG. 6. Each incoming event 602 may be routed to one of the machines (e.g., 604, 606, 608), based on some characteristics of the event. Then, the local rules engine on that machine handles the event, for example, while also reading and perhaps writing its local store, which contains information relevant to the current event. Furthermore, the events can be incorporated in the global computation. For instance, the global computation might aggregate (count, sum, average, max, etc.) properties of the events.

In production rule languages, the data used in a rule is referred to as the working memory, and each piece of data is a working memory element, or WME. Rules can match on, read, modify, and write WMEs. In the context of the present disclosure in one embodiment, the working memory encompasses a WME for the event plus a set of WMEs for the contents of the local store. For example, the event might be a flight cancellation, and the local store might include information about flights. The event characteristic used for routing in this case would be the flight number. A separate system component (an input event routing machine) may perform the routing.

In one aspect, a time feature is also taken into account when dealing with a continuous stream of events. Specifically, each event carries a timestamp, indicating the time at which it occurs. These times are taken into consideration by the computation. For instance, instead of aggregating all events irrespective of time, the computation might aggregate only events for a particular time interval or window. More concretely, the events might be airline flight arrivals, and the aggregation might compute the average delay of flights arriving in the last hour. To support this kind of computations, the rule language in the present disclosure may be augmented with features to handle time. Specifically, rules can read the time of an event, read the current time, and refer to the set of events from a particular time period.

There may be a plurality of modes of global computation, e.g., from-scratch and incremental. From-scratch computation inputs an initial data set S and outputs a result R(S). Incremental computation inputs a result R(S) and a set of changes Delta and outputs a result R(S+Delta).

Incremental computation is a way of computing a new output when the input changes. Incremental computation may save resources (time, space) compared to from-scratch computation. In from-scratch computation, the entire input is available at the start of the computation, and the computation runs on the entire input. When the input changes, one approach is to redo the from-scratch computation on the changed input. However, such computation may not be efficient, especially when the change to the input is small compared to the total size of the input data set. Incremental computation may compute the new output more efficiently by starting from the old output and the set of changes.

Figure 7:
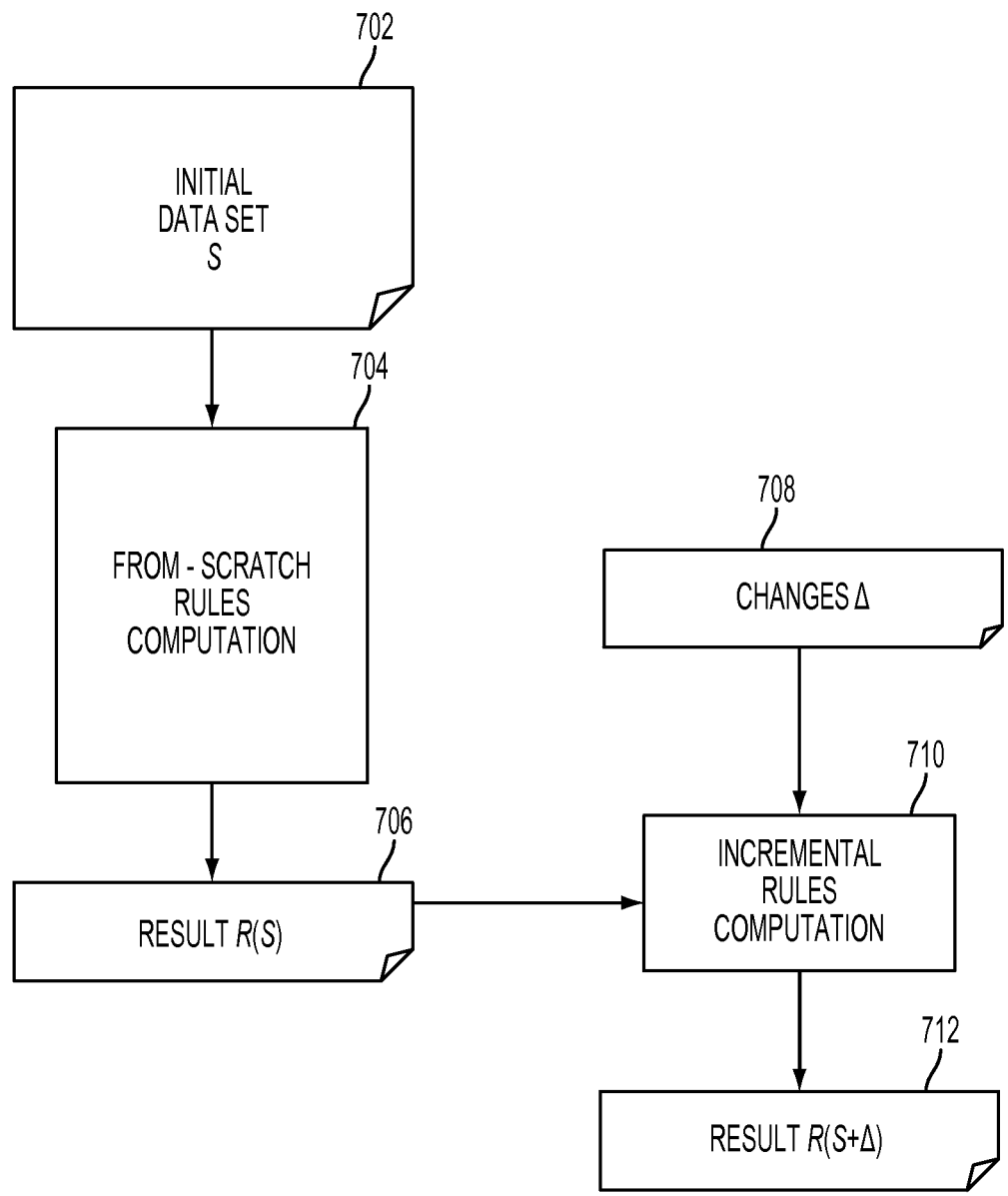
FIG. 7 shows an example of incremental computation in one embodiment of the present disclosure.

FIG. 7 shows an example of incremental computation in one embodiment of the present disclosure. Starting from an initial data set S 702, a from-scratch rules computation at 704 computes a result R(S) 706. The from-scratch rules computation at 704 may consume a lot of resources (time, space). Let Delta 708 be a set of changes to the input, e.g., the initial data set S 702. Incremental computation 710 uses the initial result R(S) 706 together with the changes Delta 708 to compute an updated result R(S+Delta) 712. The incremental rules computation at 710 may consume a smaller amount of resources (time, space) than the from-scratch computation at 704.

In one embodiment of the present disclosure, the global rules computation may be incremental. For example, a methodology of the present disclosure may use local rules engine instances on each machine to execute local rules computations. Incrementality may be implemented in the local rules engine instances in one embodiment of the present disclosure using, e.g., the RETE algorithm. For instance, rules engines such as IBM's JRules engine, includes incrementality function or capability. The name of the RETE algorithm comes from the Latin word for "network". It works by representing the (local rules) computation as a network of operations to be performed. When the data (local store) changes, the changes "flow" through this network to trigger incremental updates to the results.

For achieving global incremental computation, a methodology of the present disclosure may communicate intermediate results that have to be sent between machines incrementally. After this global communication, the incremental computation can proceed using local incremental rules engines again.

The issue of whether the global rules computation is from-scratch or incremental is orthogonal to the issue of whether the global rules computation is written in the form of local rules (distribution-aware) or global rules with a compiler (distribution-oblivious). Specifically, one way to specify incremental global rules computations is directly via local rules that include explicit primitives for communication or coordination. Another way to specify incremental global rules computations is indirectly via global rules that omit such communication and coordination primitives, and then using a translator to turn those global rules into local rules. As discussed above, such a translator may involve an algebraic intermediate representation to simplify the compiler design.

In one aspect, the methodology of the present disclosure may relate to business rule management systems (BRMS). For example, the methodology of the present disclosure may be used in communication and coordination of local rules between distributed machines operating a BRMS. In such a BRMS system of the present disclosure, computations may be performed across a distributed system wherein the data is local and the rules are local but the system works as a whole. The global rules associated with a BRMS may be compiled and deployed on distributed machines each having their own local data stores and local rules engines. The compiler may automatically handle the steps necessary for the distributed functionality, and the user generating the global rules does not need to explicitly specify such functionality. Computation results may be kept up to date for incremental updates. By distributing the BRMS across distributed machines, the computational results may be obtained faster. This methodology may be used for any other rules for performing computation on data, other than "business rules."

As described above, a local rules engine may run on each of the machines of the distributed data store. Each local rules engine treats the part of the data store on its machine as the "working memory." The global computation is executed in a coordinated manner. For example, alternating or overlapping stages of computation (e.g., run all engines in parallel, each using its local memory) and communication (move data between machines to prepare for the next computation stage) may be used. These stages can be implemented manually, or generated by a compiler. In the case where a compiler is used, the compiler may translate global rules (e.g., which may be user provided) to relational algebra (an example of a query language), insert explicit communication operators, and translate to local rules with communication.

Also as described above, an aspect of a methodology of the present disclosure includes communication and coordination regimes. One approach is to use bulk-synchronous computation with a global barrier. More generally, the language could expose the full complement of APGAS (asynchronous partitioned global address space) constructs, e.g., as found in X10, a programming language from IBM. Communication may work by adding WMEs (working memory elements) to remote WMs (working memories), for example, adding a piece of data to the local store of a different machine than the one one which the data originates. This can be either exposed directly to the user, or hidden based on a standard hashing regime. For instance, in the example shown in FIG. 2, computing "W.code( ) % P", i.e., the hash of the word modulo the number of machines, may have been specified manually. Alternatively, this could have been hidden behind a function, for example, "destination (W)", to make it implicit. Likewise, the transition from one stage of computation to the next can be performed manually, or by using the existing concept of rule-flows in systems such as JRules with which rule-based applications can be built. For instance, in the example shown in FIG. 2, each rule refers to "task.equals( . . . )" for checking the computation stage. In other words, stages are implemented manually. In contrast, with the rule-flows feature in JRules, that would not be necessary: instead, rules would be part of rule-flow stages by another language feature or by virtue of the source code file they appear in.

Also as described above, another aspect of a methodology of the present disclosure includes an automatic compilation. A user may be provided with facilities for specifying or writing one or more global rules, computation to be performed on the distributed data set as a whole. A rules programming model may be provided that implements a compiler by using relational algebra as an intermediate step. The compiler may compile from global rules with implicit communication and synchronization to algebra, and from algebra to local rules with explicit communication and synchronization. Specifically, the compiler may compile from global rules (i.e., rules with implicit communication and synchronization) to algebra, and from algebra to local rules (i.e., rules with explicit communication and synchronization).

Also as described above, another aspect of a methodology of the present disclosure includes batch and incremental computation. In batch computation, the assumption is that one starts a query on an existing data store, and computes a result as of the current state. In incremental computation, when the data store changes, one updates the computation result to reflect that change. In the context of production rule languages, the local rules engines may be already optimized for the incremental case, and hence that aspect may be reused by the methodology of the present disclosure.

Figure 8:
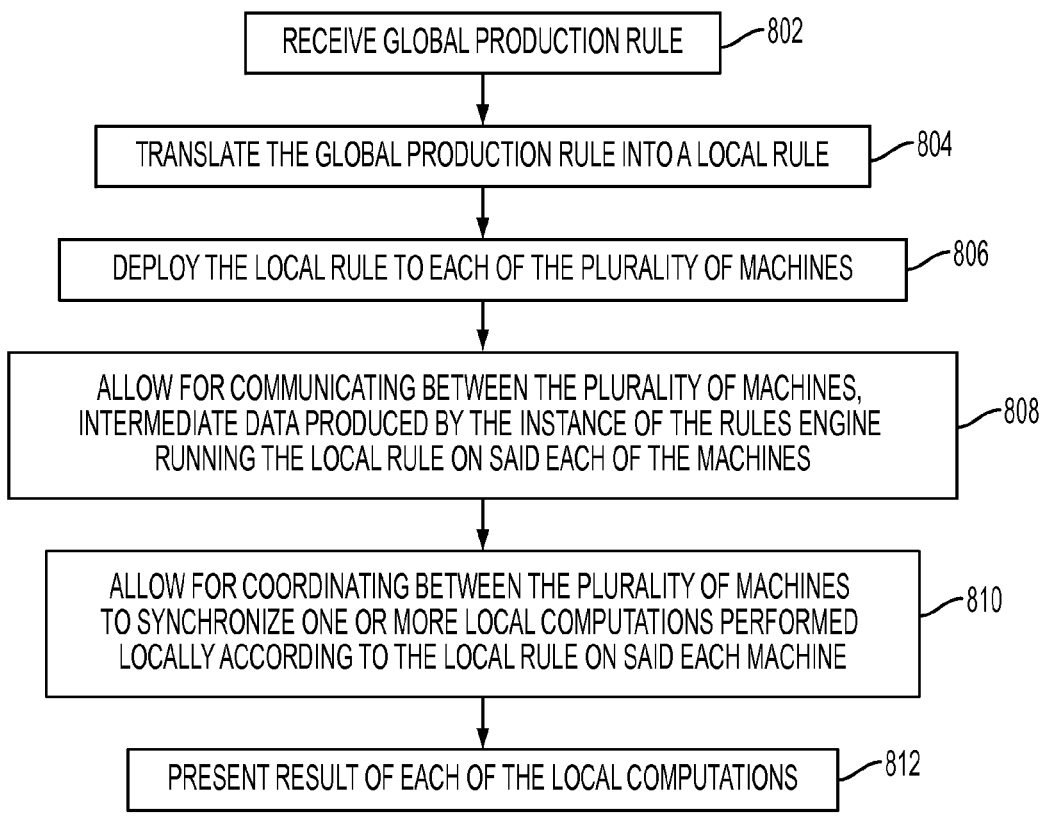
FIG. 8 is a flow diagram illustrating a method of the present disclosure for enabling global production rules for distributed data in one embodiment of the present disclosure.

FIG. 8 is a flow diagram illustrating a method of the present disclosure for running a global production rule on distributed data over a plurality of machines, in one embodiment of the present disclosure. In one embodiment of the present disclosure, a runtime system (e.g., of software or like computer executable tool) may perform communicating of intermediate results of the global computation between the machines of the cluster, and coordinating between the machines of the cluster to synchronize the local computations as the global rules computation progresses. The runtime may include centralized code for the master machine, as well as code running with each of the local rule engines for the workers. The locally run code may implement the additional features that the local rules need to support, such as the "send" feature.

As described above, there may be multiple local production rules engine instances deployed one on each machine of the cluster, and a data set (e.g., large data set) broken up into portions, each portion stored on one of the machines of the cluster.

At 802, the global production rule is received. The global production rule may comprise a global computation to be performed on the data globally. The global production rule hides distribution of the global computation from a user.

At 804, the global production rule is translated into a local rule that can run on each of the plurality of machines to jointly accomplish the global computation. For instance, as described with reference to FIG. 3, the translating may comprise translating from the global production rule to an intermediate language, transforming the intermediate language to add one or more explicit communication points, and translating from the intermediate language to the local rule.

At 806, the local rule is deployed to each of the plurality of machines. Each of the plurality of machines stores a portion of the data and runs an instance of a rules engine that can run the local rule.

At 808, the method in one embodiment allows for communicating between the plurality of machines, intermediate data produced by the instance of the rules engine running the local rule on said each of the machines. For example, as described above, the machines in the cluster may communicate with each other to exchange information for producing a global result.

At 810, the method in one embodiment allows for coordinating between the plurality of machines to synchronize one or more local computations performed locally according to the local rule on said each machine. For example, as described above, the machines in the cluster coordinate with each other to synchronize computation performed in the machines.

In one embodiment of the present disclose, the global computation is bulk-synchronous, wherein computations of a phase performed in all of the machines are synchronized by global barrier, and wherein all the machines transition to a next phase after all the machines reach the global barrier, e.g., as described with reference to FIG. 4. For instance, there may be phases in which all machines compute with their local rules engines, synchronized by global barriers in which all machines transition to the next phase.

In another embodiment of the present disclosure, the global computation is pipelined with communication between the machines, wherein the communication and the computation overlap, for instance, as described with reference to FIG. 5.

In one embodiment of the present disclosure, the global computation may employ primitives of async representing non-blocking spawn of a remote activity and finish representing waiting for the non-blocking spawned async to complete.

In one embodiment of the present disclosure, the global computation may be performed incrementally by the instance of the rules engine, for instance, as described with reference to FIG. 7.

The method may also comprise receiving a continuous stream of events, routing the events to the instance of the rules engine, and using external events in the computation, for example, as described with reference to FIG. 6. The events may be associated with time and the local rule may employ time as a condition in running of the local rule.

At 812, the results of the computation at each of the machines are presented, for example, as a global computation result. In one aspect, the results produced at each of the machines may be presented as is, to represent the global result. In another aspect, the results may be aggregated to produce a global result. For instance, if the results are presented as is, they may be stored in the local stores of the machines producing them, from where they can be retrieved or used like any other data in the local stores. If the results get aggregated and reported out, such aggregation and reporting may be done via a separate machine that may receive or retrieve the local results and present the output.

Figure 9:
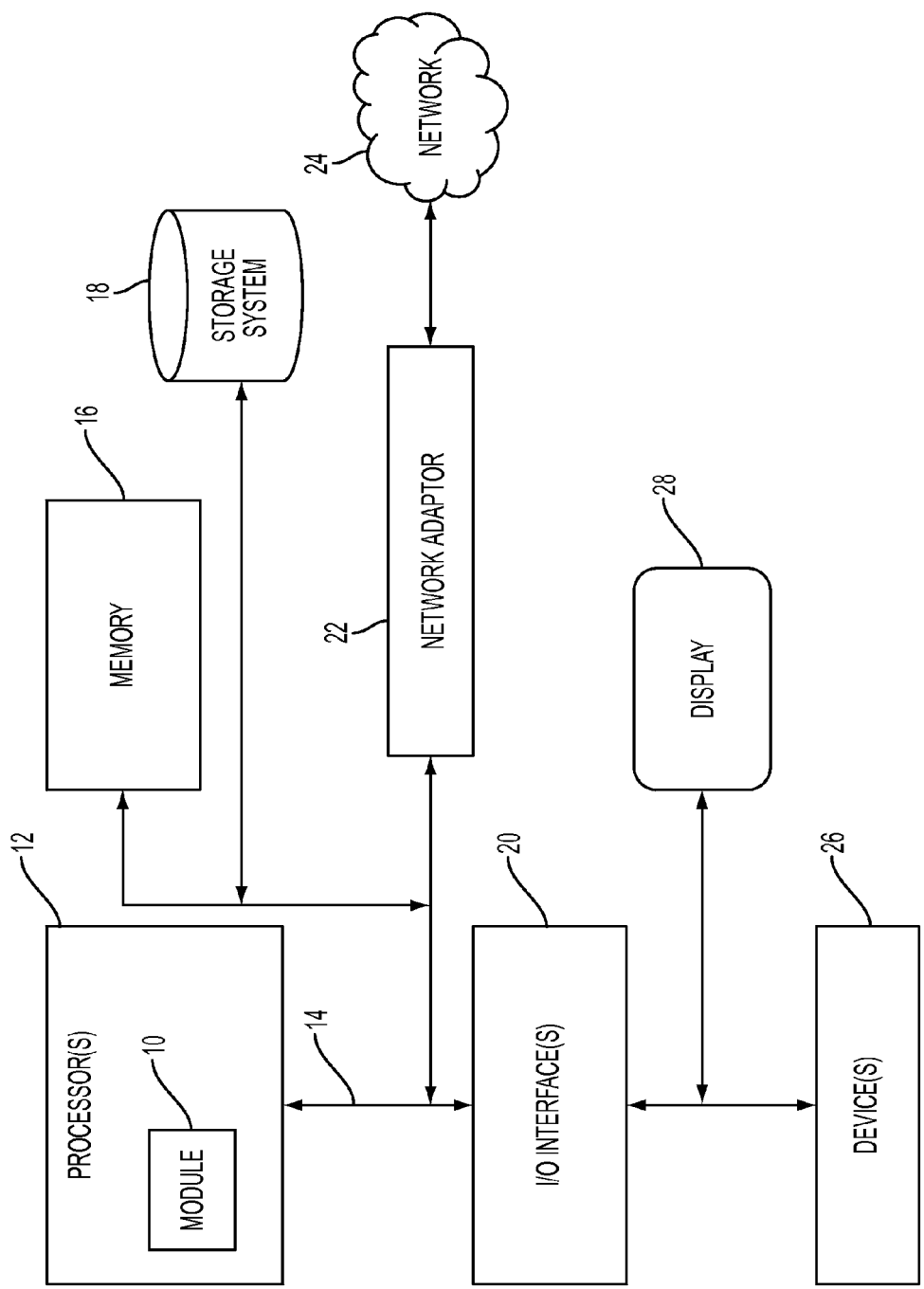
FIG. 9 illustrates a schematic of an example computer or processing system that may implement a global production rules for distributed data in one embodiment of the present disclosure.

FIG. 9 illustrates a schematic of an example computer or processing system that may implement global production rules for distributed data in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of running a global production rule on data distributed over a plurality of machines, comprising:
   receiving a local production rule that can run on each of the plurality of machines to jointly accomplish a global computation specified in a global production rule;
   deploying the local production rule to each of the plurality of machines, said each of the plurality of machines storing a portion of the data and running an instance of a rules engine that can run the local rule;
   allowing communicating between the plurality of machines, intermediate data produced by the instance of the rules engine running the local production rule on said each of the machines;
   allowing coordinating between the plurality of machines to synchronize one or more local computations performed locally according to the local production rule on said each machine;
   receiving a continuous stream of events;
   routing the events to the instance of the rules engine; and
   using external events in the computation.

2. The method of claim 1, wherein the global production rule hides distribution of the global computation from a user.

3. The method of claim 1, further comprising receiving the global production rule, the global production rule comprising the global computation to be performed on the data globally, wherein the receiving a local production rule that can run on each of the plurality of machines to jointly accomplish the global computation specified in the global production rule comprises translating the global production rule into the local production rule that can run on each of the plurality of machines to jointly accomplish the global computation.

4. The method of claim 3, wherein the translating comprises translating from the global production rule to an intermediate language, transforming the intermediate language to add one or more explicit communication points, and translating from the intermediate language to the local production rule.

5. The method of claim 1, wherein the global computation is bulk-synchronous, wherein computations of a phase performed in all of the machines are synchronized by global barrier, and wherein all the machines transition to a next phase after all the machines reach the global barrier.

6. The method of claim 1, wherein the global computation is pipelined with communication between the machines, wherein the communication and the global computation overlap.

7. The method of claim 1, wherein the global computation employs primitives of a sync representing non-blocking spawn of a remote activity and finish representing waiting for the non-blocking spawned a sync to complete.

8. The method of claim 1, wherein the events are associated with time and the local production rule employs time as a condition in running of the local production rule.

9. The method of claim 1, wherein the rules engine comprises incremental rules engine and wherein the global computation is performed incrementally by the instance of the rules engine.

10. A system for running a global production rule on data distributed over a plurality of machines, comprising:
a processor;
a module operable to execute on the process and further operable to receive a local production rule that can run on each of the plurality of machines to jointly accomplish a global computation to be performed on the data globally and specified in the global production rule,
the module further operable to deploy the local production rule to each of the plurality of machines, said each of the plurality of machines storing a portion of the data and running an instance of a rules engine that can run the local production rule,
wherein communicating between the plurality of machines, intermediate data produced by the instance of the rules engine running the local production rule on said each of the machines, is allowed via execution of the local production rule;
wherein coordinating between the plurality of machines to synchronize one or more local computations performed locally according to the local production rule on said each machine, is allowed via execution of the local production rule;
wherein the global production rule is automatically translated into the local production rule; and
wherein to translate the global production rule automatically translated into the local production rule, the global production rule is automatically translated into an intermediate language, the intermediate language is automatically transformed to add one or more explicit communication points, and the intermediate language is automatically translated to the local production rule.

11. The system of claim 10, wherein the global production rule hides distribution of the global computation from a user.

12. The system of claim 10, wherein the global computation is bulk-synchronous, wherein computations of a phase performed in all of the machines are synchronized by global barrier, and wherein all the machines transition to a next phase after all the machines reach the global barrier.

13. A non-transitory computer readable storage medium storing a program of instructions executable by a machine to perform a method of running a global production rule on data distributed over a plurality of machines, the method comprising:
receiving a local production rule that can run on each of the plurality of machines to jointly accomplish a global computation to be performed on the data globally and specified in the global production rule;
deploying the local production rule to each of the plurality of machines, said each of the plurality of machines storing a portion of the data and running an instance of a rules engine that can run the local production rule;
allowing communicating between the plurality of machines, intermediate data produced by the instance of the rules engine running the local production rule on said each of the machines;
allowing coordinating between the plurality of machines to synchronize one or more local computations performed locally according to the local production rule on said each machine;
receiving a continuous stream of events;
routing the events to the instance of the rules engine; and
using external events in the computation.

14. The computer readable storage medium of claim 13, wherein the global production rule hides distribution of the global computation from a user.

15. The computer readable storage medium of claim 13, wherein the receiving a local production rule that can run on each of the plurality of machines to jointly accomplish the global computation specified in the global production rule comprises translating the global production rule into the local production rule that can run on each of the plurality of machines to jointly accomplish the global computation.

16. The computer readable storage medium of claim 15, wherein the translating comprises translating from the global production rule to an intermediate language, transforming the intermediate language to add one or more explicit communication points, and translating from the intermediate language to the local production rule.

17. The computer readable storage medium of claim 13, the global computation is pipelined with communication between the machines, wherein the communication and the global computation overlap.

* * * * *